United States Patent [19]

Kizu

[11] Patent Number: 5,124,850
[45] Date of Patent: Jun. 23, 1992

[54] METHOD AND APPARATUS FOR EQUALIZING FM VIDEO SIGNALS USING VARIABLE EQUALIZER

[75] Inventor: Shigeo Kizu, Yokohama, Japan

[73] Assignee: Kabushiki Kaisha Toshiba, Kawasaki, Japan

[21] Appl. No.: 436,735

[22] Filed: Nov. 15, 1989

[30] Foreign Application Priority Data

Nov. 15, 1988 [JP] Japan .................. 63-288421

[51] Int. Cl.$^5$ .................. H04N 5/91; H04N 5/52
[52] U.S. Cl. .................. 360/33.1; 360/65; 358/335; 358/177
[58] Field of Search .................. 360/65, 33.1; 358/335, 358/340, 327, 38, 166, 167, 174, 176, 177; 369/48

[56] References Cited

U.S. PATENT DOCUMENTS 3,643,013  2/1972  Lemoine .................. 360/65
4,509,155  4/1985  Masuda .................. 369/48

FOREIGN PATENT DOCUMENTS 241227 10/1987 European Pat. Off. .
2506981 12/1983 France .
62-248107 10/1987 Japan .
62-248108 10/1987 Japan .

OTHER PUBLICATIONS

Patent Abstracts of Japan, vol. 9, No. 148 (P-355)(1871) 22 Jun. 1985, & JP-A-60 025008 (Matsushita Denki Sangyo K.K.) 7 Feb. 1985.

*Primary Examiner*—Donald D. McElheny, Jr.
*Attorney, Agent, or Firm*—Oblon, Spivak, McClelland, Maier & Neustadt

[57] ABSTRACT

An equalization apparatus in which a variable equalizer is used to equalize the frequency response of an FM video signal obtained by frequency-modulating a carrier signal with a video signal in which a reference signal of a constant frequency is inserted during a predetermined interval. The equalization apparatus includes a comparator section for making a comparison in amplitude between first upper and lower sidebands in the FM video signal and a control section for controlling the variable equalizer in accordance with an output of the comparator section.

15 Claims, 7 Drawing Sheets

METHOD AND APPARATUS FOR EQUALIZING FM VIDEO SIGNALS USING VARIABLE EQUALIZER

BACKGROUND OF THE INVENTION

1. Field of the Invention

The present invention relates to a method and apparatus for equalizing the frequency response (frequency characteristic) of an FM video signal (frequency modulated video signal) using a variable equalizer and a video recording and reproducing apparatus.

2. Description of the Related Art

With video recording and reproducing equipment represented by video tape recorders (VTRs), a video signal is generally recorded on magnetic tape by a magnetic head in the form of an FM signal (frequency modulated signal). The FM video signal is obtained by frequency-modulating a carrier signal whose frequency is above the baseband of the video signal with a video signal. The FM video signal reproduced from the magnetic tape by a reproduce head is amplified by a preamplifier to an adequate level for the subsequent signal processing and then entered into an equalizer, which compensates for variations in the frequency response of the FM video signal which result from the processes of recording and reproducing the FM signal. The operation of compensation is called the equalization. The FM video signal equalized by the equalizer is applied to an FM demodulator where the baseband video signal is recovered.

Figure 1:
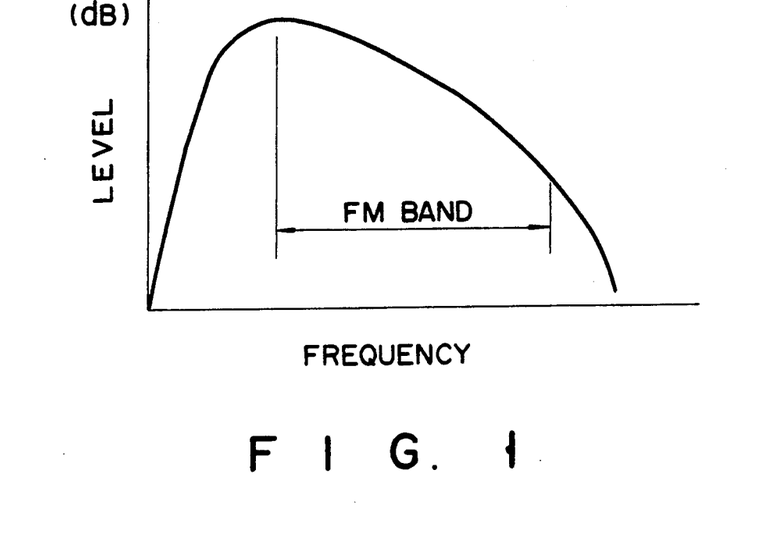
FIG. 1 illustrates the frequency response of the recording/playback system of a VTR.

The role of the equalizer will be explained in more detail. When passing through the record/reproduce system, the FM video signal is influenced by the gap loss associated with the gap length of the magnetic head and the space loss associated with the distance between the magnetic head and the magnetic tape. The reproduced FM video signal thus has such a low-frequency emphasized response as shown in FIG. 1 in which it is nonlinear within the FM band (frequency band for recording) and the amount of attenuation increases as frequency increases. When the reproduced FM video signal having such a frequency response is directly applied to the FM demodulator for demodulation, the resultant baseband video signal will have no flat frequency response and generally has its high frequency components raised. The reproduced FM video signal is equalized by an equalizer in order to flatten the frequency response of the baseband video signal to be demodulated.

To flatten the frequency response of the demodulated baseband video signal, it is required to adjust the frequency response of the equalizer properly. In general, the frequency response of the equalizer is adjusted before the shipment of VTR and then fixed. With some VTRs of studio type, a user can adjust the frequency response of the equalizer with a trimmer.

In VTRs, the frequency response of a reproduced FM video signal varies because of variations in a recording current, the wear of magnetic heads, a difference in azimuth angle between recording and reproducing heads and variations in head-to-tape spacing. When, therefore, the frequency response of the equalizers is fixed, the frequency characteristics of the equalized FM video signals are not always flat but vary. Such variations in the frequency characteristics are allowed to some extent in household VTRs, but must be suppressed to a minimum in high-definition VTRs which are now being developed. With existing VTRs of studio type, special test signals, such as multi-burst signals or frequency-sweep signals, are used to monitor the frequency response of the reproduced baseband video signal so that the user may adjust the response of the equalizer using the trimmer. However, it is very complicated and time-consuming to perform such manual adjustment each time the VTR is put to use.

Techniques are known which monitor the frequency response of a reproduced FM signal using low-frequency and high-frequency signal components in a reproduced signal to automatically adjust the response of a variable equalizer. For example, in published unexamined Japanese patent applications Nos. 62-248107 and 62-248108, the downshifted frequency converted chroma signal is used as the low-frequency signal component and the frequency-modulated horizontal-sync signal is used as the high-frequency signal component in VTRs using the color-under recording system. In playback, both the signals are compared with each other in magnitude to detect the frequency response of the reproduced FM video signal and to control the variable equalizer accordingly. The recording levels of the downshifted frequency converted chroma signal and the frequency-modulated horizontal sync signal are not necessarily constant. It is thus difficult to correctly monitor the frequency response of the reproduced FM video signal by comparison in level between the signals. Hence, the equalizer cannot necessarily be controlled properly. Also, the techniques cannot be applied to studio-type VTRs and high-definition VTRs using systems other than the color-under recording system.

SUMMARY OF THE INVENTION

It is a first object of the present invention to provide an equalizer which automatically equalizes the frequency response of a reproduced FM video signal without being affected by variations in the recording level of a video signal.

It is a second object of the present invention to provide a method of automatically equalizing the frequency response of a reproduced FM video signal using a variable equalizer without being affected by variations in the recording level of a video signal.

It is a third object of the present invention to provide a video recording and playback apparatus using such an equalizer.

According to the present invention, the first object is attained by an equalization apparatus for equalizing a modulated video signal obtained by frequency-modulating a carrier signal with a video signal inserted a reference signal in a predetermined period, comprising: a variable equalizer having a controllable response, for equalizing the frequency response of the FM video signal; a comparing section for comparing each amplitude of at least a pair of upper and lower sidebands in the modulated video signal which each are symmetrical with respect to the frequency of the carrier signal; and a controller for controlling the response of the variable equalizer according to an output of the comparator.

According to an aspect of the present invention, there is provided an equalization apparatus for an FM video signal obtained by frequency-modulating a carrier signal with a video signal in which a reference signal of a constant frequency is inserted during a predetermined interval, comprising: a variable equalizer for equalizing the frequency response of the FM video signal; a detector for detecting a ratio in amplitude between a pair of upper and lower sidebands in an FM video output signal of the variable equalizer which are symmetrical about the frequency of the carrier signal; and a controller for controlling the variable equalizer such that the detected ratio in amplitude between the upper and lower sidebands takes a predetermined constant value.

According to another aspect of the present invention, there is provided an equalization apparatus for an FM video signal obtained by frequency-modulating a carrier signal with a video signal in which a reference signal of a constant frequency is inserted during a predetermined interval, comprising: a variable equalizer for equalizing the frequency response of the modulated video signal; a comparator for making a comparison in amplitude between a pair of upper and lower sidebands in an FM video input signal of the variable equalizer which are symmetrical about the frequency of the carrier signal; and a generator for converting the amplitude and DC level of an output signal of the comparator to generate a control signal for controlling the variable equalizer.

According to the present invention, to attain the second object, in equalizing the frequency response of a reproduced FM video signal by the use of a variable equalizer in apparatus for recording and reproducing a video signal as an FM video signal, at least two frequency components are extracted from the reproduced FM video signal, the levels of which vary at the same rate as the recording level of a video signal (or a modulating signal). The extracted two frequency components are then compared with each other in level. The variable equalizer is controlled in accordance with the result of the comparison.

According to the present invention, the third object is attained by comprising: a circuit for generating an FM video signal by frequency-modulating a carrier signal with a video signal in which a burst signal of a predetermined frequency is inserted during a predetermined blanking interval; a recording system for recording the FM video signal; a reproducing system for reproducing the recorded FM video signal; a variable equalizer for equalizing the frequency response of the reproduced FM video signal; a comparator for making a comparison, during the predetermined interval, in amplitude between a pair of upper and lower sidebands in the reproduced FM video signal which are symmetrical about the frequency of the carrier signal; and a controller for controlling the variable equalizer according to the output of the comparator.

According to an aspect, in the video recording and reproducing apparatus, the FM video signal is recorded on a magnetic recording medium by a plurality of recording heads and reproduced by a plurality of playback heads. The FM video signals reproduced by the playback heads are multiplexed by a multiplexer for transmission over one channel and then entered into the variable equalizer. The comparator makes a comparison in amplitude between a pair of upper and lower sidebands in the FM video signal which are symmetrical about the frequency of the carrier signal. The variable equalizer is controlled by the output of the comparator. The controller has a plurality of control signal generators for generating control signals for controlling the variable equalizer in accordance with the output of the comparator and switches the control signal generators in synchronization with the multiplexer.

DETAILED DESCRIPTION OF THE PREFERRED EMBODIMENTS

The basic principle underlying the embodiments of the present invention will be described first.

Figure 2:
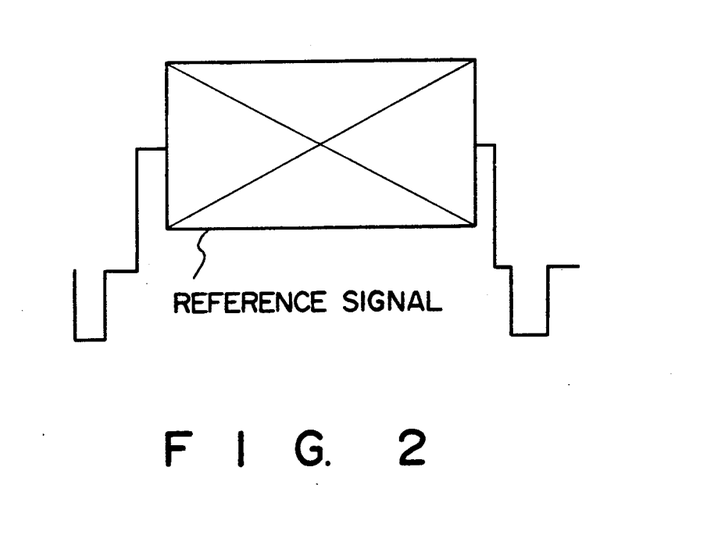
FIG. 2 illustrates a signal waveform used for explaining the principle of the present invention.
Figure 3:
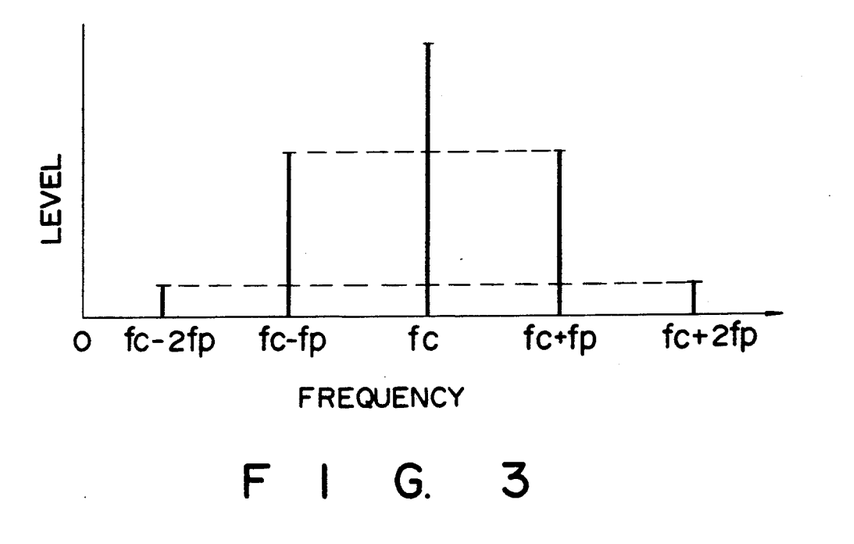
FIG. 3 illustrates the frequency spectrum of an FM video signal to be recorded.

As shown in FIG. 2, a video signal is produced in which a high-frequency signal (preferably a sinusoidal signal) with a constant frequency is inserted as a reference signal during a predetermined interval. The frequency-modulation of a carrier signal with the video signal will produce such a frequency spectrum as shown in FIG. 3 for the FM video signal during the interval. As shown in FIG. 3, the frequency spectrum comprises a component of carrier frequency fc and a large number of sideband components which are distributed symmetrically with respect to fc. More specifically, assuming the frequency of the reference signal serving as a modulating signal to be fp, the upper sidebands are produced in the frequency positions represented by $fc + n\,fp$ ($n=a$ positive integer), while the lower sidebands are produced in the frequency positions represented by $fc - n\,fp$. The upper and lower sidebands of the same order n have equal amplitudes. When a relatively high frequency within the baseband of the video signal is selected as fp, energy will generally be concentrated on the first upper and lower sidebands and energy on the second and higher-order sidebands is low for the FM band used in recording/playback in VTRs.

Figure 4:
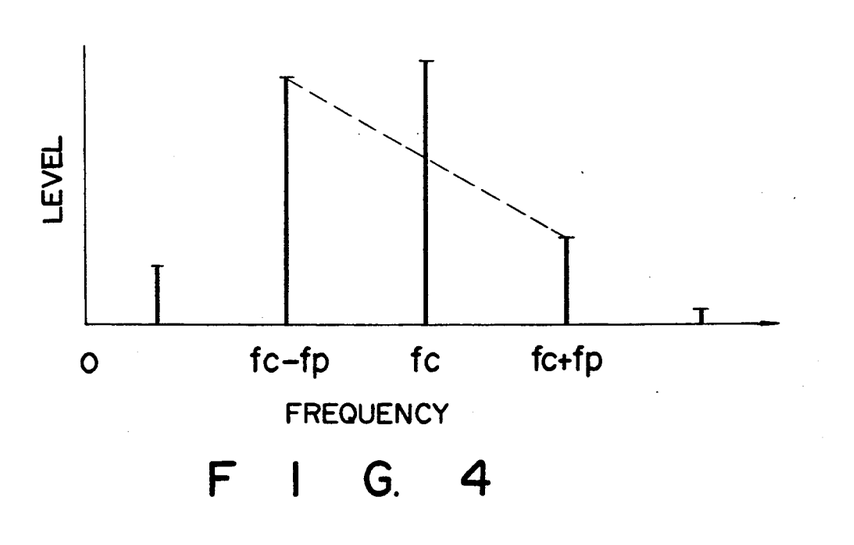
FIG. 4 illustrates the frequency spectrum of the reproduced FM video signal.

When such an FM video signal is recorded and reproduced, the reproduced FM video signal will have a frequency response in which the amplitude of the upper sideband is lower than the amplitude of the lower sideband as shown in FIG. 4 because the frequency response of the recording/reproducing system is of a low-frequency emphasizing type as shown in FIG. 1. Hence, if a pair of upper and lower sidebands (e.g., the upper first sideband and the lower first sideband) which are symmetrical with respect to the carrier frequency are extracted for amplitude comparison, the frequency response of the reproduced FM video signal will be monitored. The amplitudes of the paired upper and lower sidebands vary at the same factor relative to the variations in amplitude of the reference signal at a time of recording. The result of the amplitude comparison correctly reflects only the frequency response of the reproduced FM video signal without being affected by amplitude variations in the reference signal at a time of recording. Accordingly, the proper equalization can be achieved by controlling an equalizer for the reproduced FM video signal on the basis of a result of the amplitude comparison.

An embodiment of the present invention will be described below with respect to a high-definition VTR.

Figure 5:
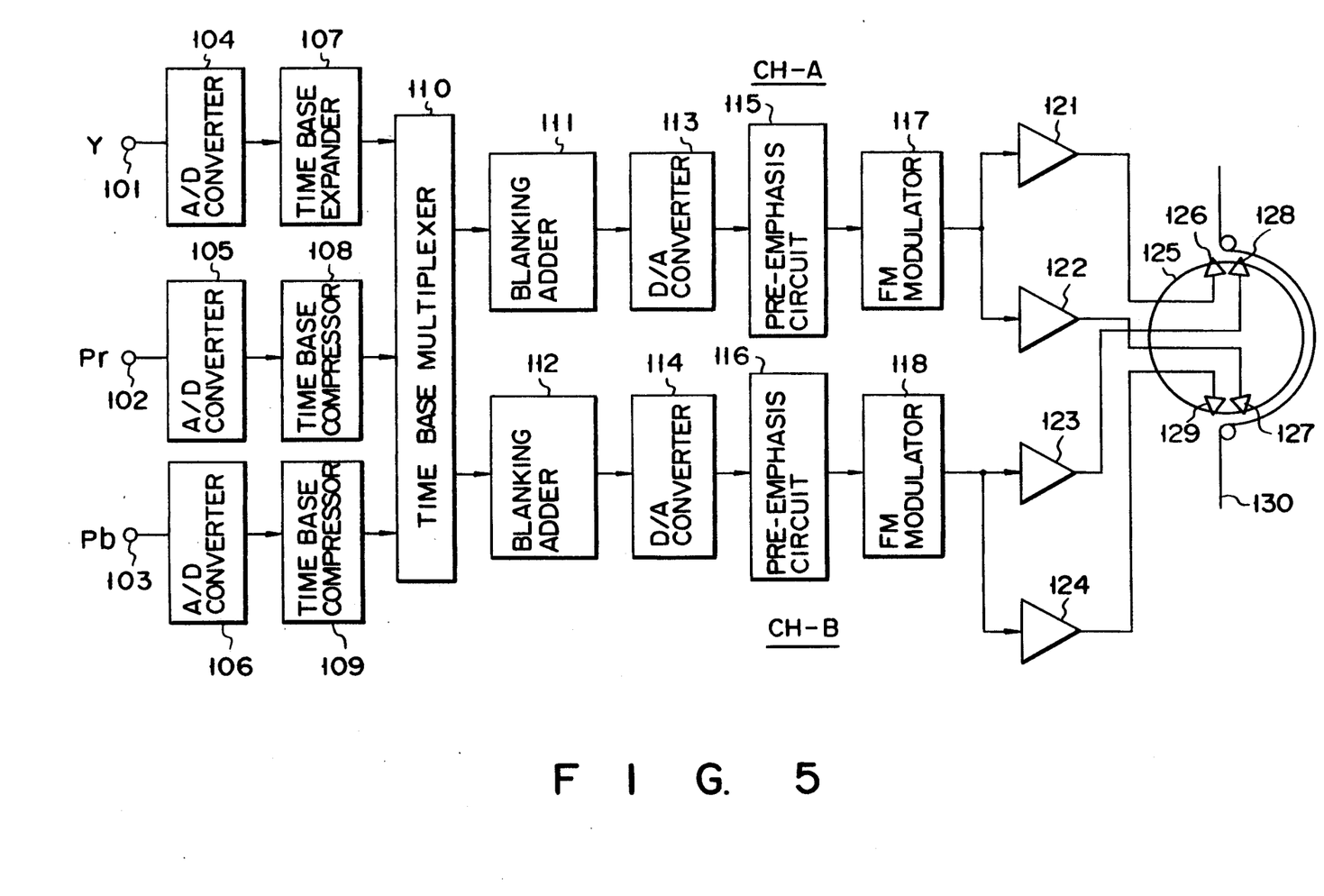
FIG. 5 is a block diagram of a recording system according to an embodiment of the present invention.

FIG. 5 is a block diagram of the recording system in the embodiment of the present invention. In the Figure, input terminals 101, 102 and 103 are connected to respectively receive a luminance signal Y and two types of color difference signals Pr and Pb which form a high-definition television (HDTV) signal. The signals Y, Pr and Pb are each converted to digital signals by A/D converters 104, 105 and 106. The digital Y signal output from A/D converter 104 is subjected to time-base expansion by time-base expander 107. The digital color difference signals Pr and Pb output from A/D converters 105 and 106 are subjected to time-base compression in time-base compressors 108 and 109. Output signals of time-base expander 107 and time-base compressors 108 and 109 are multiplexed by a time-base multiplexer 110 to produce a time compressed integration (TCI) video signal.

The TCI video signal is divided into channels A and B. The TCI signals on channels A and B are respectively applied to blanking adders 111 and 112 where necessary information for a blanking period is inserted and then applied to D/A converters 113 and 114 for conversion to analog signals.

Figure 6:
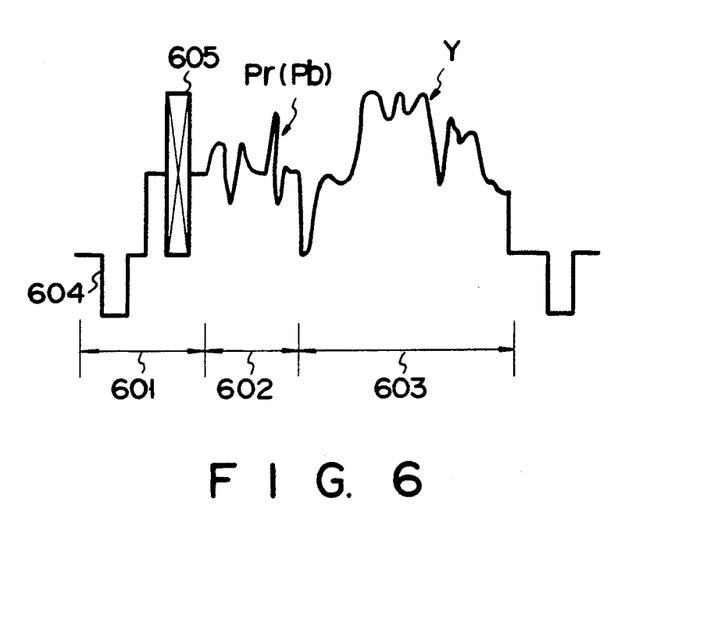
FIG. 6 illustrates a waveform of part of a video signal.

Illustrated in FIG. 6 is the waveform of a video signal for one horizontal line at outputs of D/A converters 105 and 106. One horizontal line period comprises horizontal blanking interval 601, chroma-signal interval 602 and luminance-signal interval 603. A sync signal 604 and a burst signal 605 for providing timing reference necessary for signal processing at a time of playback are inserted in the horizontal blanking interval 601. In the present embodiment, the burst signal 605 is also used as the reference signal adapted to observe the frequency response of the reproduced FM video signal. The burst signal 605 is a sinusoidal signal of a frequency of about 7 MHz and a level of amplitude of 100%, which is inserted in a DC level corresponding to 50% of the luminance signal level.

Returning to FIG. 5, the TCI video signals output from D/A converters 113 and 114 on the channels A and B are applied to preemphasis circuits 115 and 116 for emphasizing the amplitudes of high-frequency components and then applied to FM modulators 117 and 118. FM modulators 117 and 118 each frequency-modulate a carrier signal centered at 19 MHz, for example, with the input TCI video signal serving as a modulating signal to produce an FM video signal. An output signal of FM modulator 117 is amplified by recording amplifiers 121 and 122, while an output signal of FM modulator 118 is amplified by recording amplifiers 123 and 124. Output signals of recording amplifiers 121 to 124 are applied to recording heads 126 to 129 mounted on a rotating drum 125 via rotary transformers (not shown) and recorded on helical tracks of magnetic tape 130.

Figure 7:
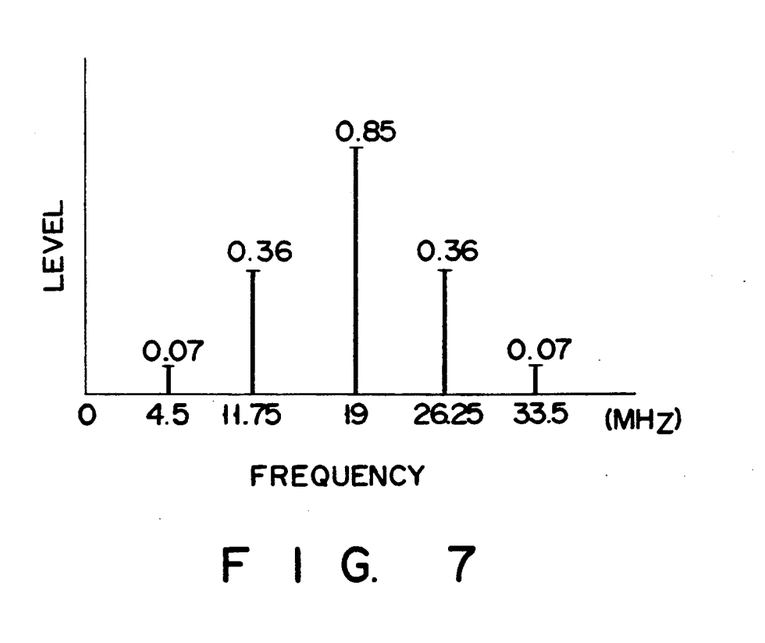
FIG. 7 illustrates the frequency spectrum of a recorded FM video signal.

In FIG. 7 there is illustrated the frequency spectrum of the FM video signals output from FM modulators 117 and 118 during the time interval of burst signal 605. This may also be regarded as the frequency spectrum of recording currents flowing through recording heads 126 to 129 during the same interval. Assuming that the carrier-signal frequency is 19 MHz, the burst-signal frequency is 7.25 MHz, the frequency deviation of the FM video signal is 2.27 MHz, the amount of emphasis in preemphasis circuits 115 and 116 is 8 dB (2.51-fold), and the level of the non-modulated carrier signal (19 MHz) is 1, the level of the carrier signal will be 0.85, the level of the first-order upper and lower sidebands will be 0.36 and the level of the second-order upper and lower sidebands will be 0.07 as shown in FIG. 7.

Figure 8:
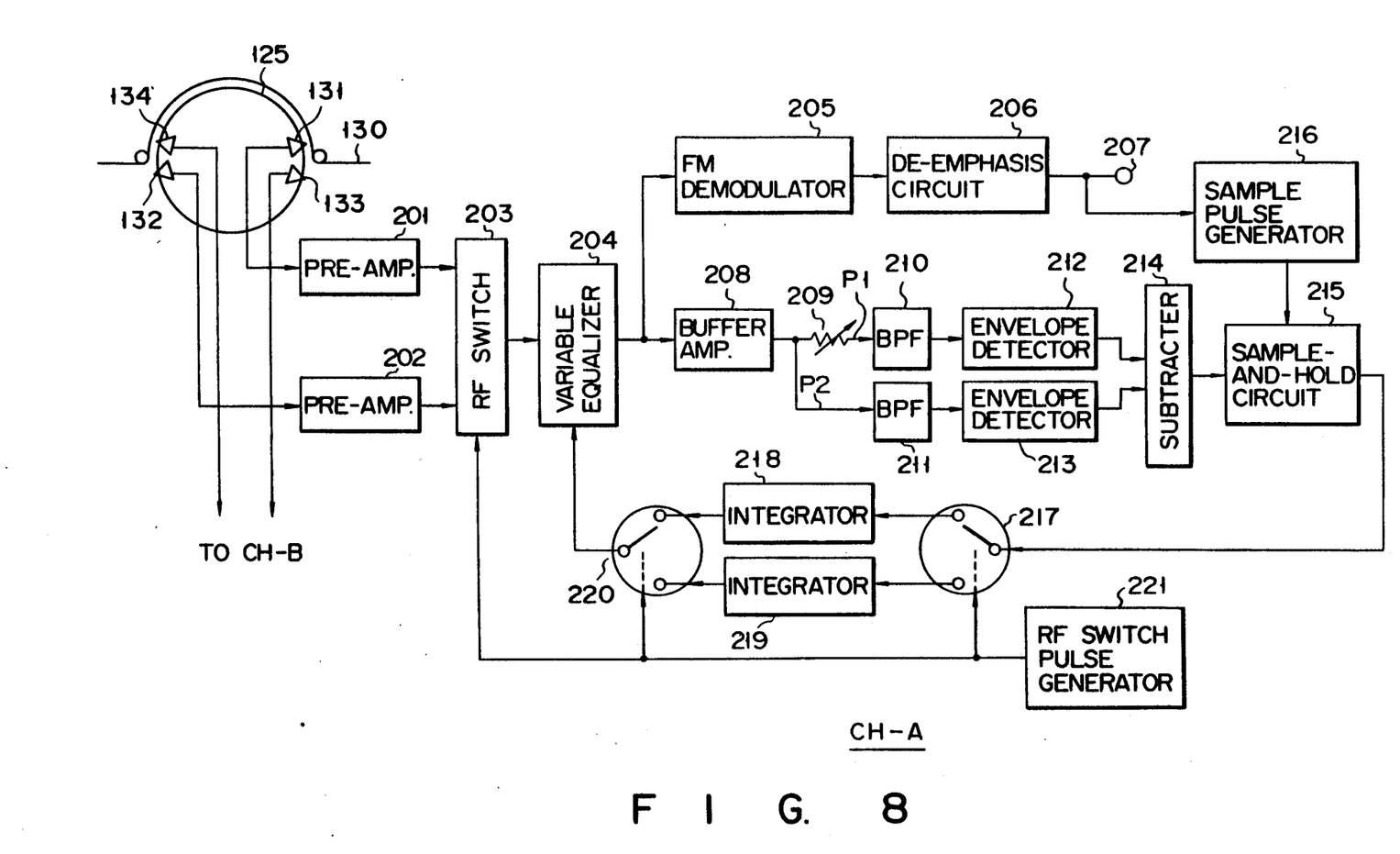
FIG. 8 is a block diagram of the playback system according to the embodiment of the present invention.
Figure 9A:
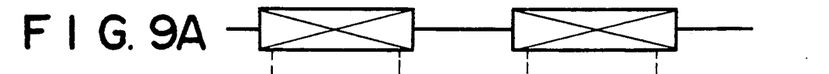
FIGS. 9A to 9D show a timing diagram used for explaining the operation of the RF switches in FIG. 8.
Figure 9B:
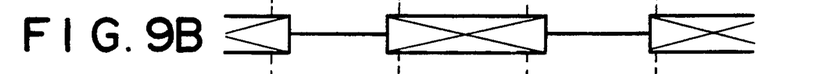
Figure 9C:
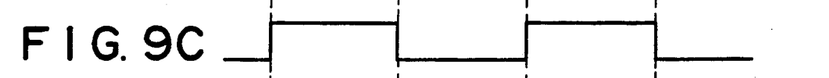
Figure 9D:
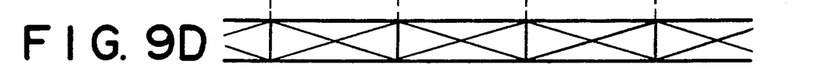

FIG. 8 illustrates a reproducing circuit for reproducing an FM video signal from magnetic tape 130 and processing it. FIG. 8 illustrates only circuits associated with channel A, but the same circuits are also associated with channel B. Playback heads 131 to 134 mounted on rotating drum 125 each reproduce an FM video signal recorded on magnetic tape 130. Playback heads 131 to 134 may be used as recording heads 126 to 129. The FM video signal for channel A reproduced by playback heads 131 and 132 is applied to preamplifiers 201 and 202 via the rotary transformers. Preamplifiers 201 and 202 each amplify the FM video signal up to a level for the subsequent signal processing and apply it to a radio frequency (RF) switch 203. Since playback heads 131 and 132 contact magnetic tape 130 alternately, the reproduced FM video signal is intermittently output from preamplifiers 201 and 202 when playback heads 131 and 132 contact magnetic tape 130 as shown in FIGS. 9A and 9B. The period of time during which the reproduced FM video signal is output from each of the preamplifiers 201 and 202 corresponds to a time required by rotary drum 125 to rotate through an angle of about 180 degrees. RF switch 203 is switched by a switch pulse of FIG. 9C generated by RF switch pulse generator 221. The FM video signals, which are alternately output from preamplifiers 201 and 202, are combined into one continuous FM video signal by RF switch 203 as shown in FIG. 9D. The switch pulse is generated by RF switch pulse generator 221 on the basis of a drum PG (pulse generator) pulse generated by a pulse generator (not shown) incorporated in a rotating drum assembly (not shown) as rotating drum 125 rotates.

Figure 10:
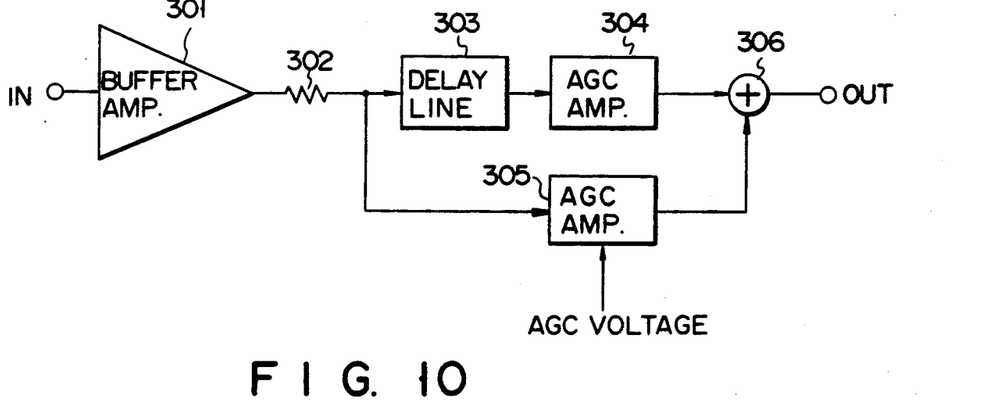
FIG. 10 shows a specific arrangement of a variable equalizer in FIG. 8.

The output signal of RF switch 20 is applied to variable equalizer 204 for equalization of its frequency response. Variable equalizer 204 has an electrically controllable equalizing response and, more specifically, can be implemented by a combination of a known cosine equalizer and a plurality of automatic gain control (AGC) amplifiers as shown in FIG. 10. In FIG. 10, an input signal is applied to a delay line 303 via an impedance-converting buffer amplifier 301 and an impedance-matching resistor 302. An output signal of delay line 303 is applied to a first AGC amplifier 304. The signal from resistor 302 is also applied to second AGC amplifier 305. AGC amplifier 304 is formed of a noninverting amplifier the gain of which is fixed. AGC amplifier 305 is formed of an inverting amplifier whose gain is controlled by an externally applied AGC voltage. An adder 306 adds output signals of AGC amplifiers 304 and 305 together to provide an output signal of variable equalizer 204. By making the delay characteristics of AGC amplifiers 304 and 305 equal to each other, adder 306 can cancel out influences of the delay characteristics of AGC amplifiers 304 and 305, improving the performance of variable equalizer 204. It is to be noted that variable equalizer 204 may be formed by a cascade connection of the circuit of FIG. 10 serving as a unit circuit.

Referring back to FIG. 8, the output signal of variable equalizer 204 is applied to FM demodulator 205 and buffer amplifier 208. FM demodulator 205 demodulates the input FM video signal to provide a baseband video signal. The baseband video signal is then applied to deemphasis circuit 206 complementary in its response to preemphasis circuits 115 and 116 of FIG. 5 so that its high-frequency components which have been emphasized by preemphasis circuits 115 and 116 may be weakened. An output signal of deemphasis circuit 206 is applied to a succeeding circuit via video output terminal 207.

Figure 11:
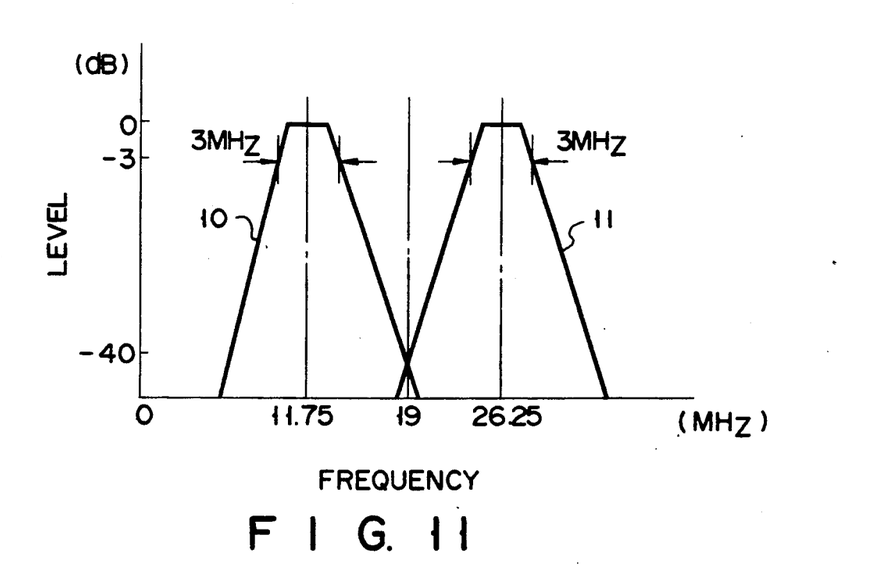
FIG. 11 is a diagram for explaining the characteristics of the bandpass filters of FIG. 8.

The output signal of buffer amplifier 208 is divided between two signal paths P1 and P2. The signal on signal path P1 is applied to a first bandpass filter (BPF) 210 via a gain trimmer 209, while the signal on signal path P2 is directly applied to a second BPF 211. The frequency responses of BPFs 210 and 211 are respectively represented by lines 10 and 11 of FIG. 11. BPFs 210 and 211 extract the first lower sideband and the first upper sideband, respectively, from the reproduced FM video signal. As indicated in FIG. 7 as well, the frequencies of the first lower and upper sidebands are 11.75 MHz and 26.25 MHz, respectively, for the burst signal. The 3-dB-down bandwidth of BPFs 210 and 211 is 3 MHz and the amount of attenuation at the carrier frequency (19 MHz) is −40 dB or more. Such a frequency response can be implemented by a relatively small inexpensive filter. Gain trimmer 209 is a semistationary attenuator which is adjusted beforehand prior to shipment of VTRs. As a result of the adjustment of gain trimmer 209 the ratio of the amplitude of the first lower sideband to that of the first upper sideband in the reproduced FM video signal input from variable equalizer 204 during the burst-signal period is controlled so that the final frequency response of the reproduced FM video signal is determined.

Output signals of BPFs 210 and 211 are detected by envelope detectors 212 and 213, respectively. Output signals of detectors 212 and 213 are applied to a subtracter 214 to obtain a difference therebetween. The operation of subtracter 214 corresponds to the comparison in amplitude between the first lower and upper sidebands. An output signal of subtracter 214 is applied to a sample and hold circuit 215 to sample and hold a burst-signal portion. Sample and hold circuit 215 is supplied with a sample pulse generated by sample pulse generator 216 at the timing of the burst signal in response to the baseband video signal from deemphasis circuit 206. Hence, sample and hold circuit 215 samples the output signal of subtracter 214 at each of the burst signals and holds it until the next burst signal arrives.

An output signal of sample and hold circuit 215 is selectively applied to one of first and second integrators 218 and 219 through a switch 217. Switch 217 supplies the output signal of sample and hold circuit 215 to integrator 218 when playback head 131 is in contact with magnetic tape 130 and supplies the out-put signal of sample and hold circuit 215 to integrator 219 when playback head 132 is in contact with magnetic tape 130. One of output signals of integrators 218 and 219 is selected by a switch 220, which is switched at the same time as switch 217, for application to variable equalizer 204 as a control voltage (AGC voltage). Consequently, FM video signals reproduced by playback heads 131 and 132 are subjected to equalization of frequency response separately in variable equalizer 204. Switching signals for switches 217 and 220 are provided by RF switch pulse generator 221.

According to the present embodiment, the output signal of sample and hold circuit 215 is applied to variable equalizer 204 via switch 217, integrator 218 or 219 and switch 220. That is, variable equalizer 203, buffer amplifier 208, gain trimmer 209, BPFs 210 and 211, detectors 212 and 213, subtracter 214, sample and hold circuit 215, switch 217, integrators 218 and 219 and switch 220 constitute a feedback control system. By this feedback control system, variable equalizer 204 is controlled such that the output signal of sample and hold circuit 215 is minimized (namely, becomes zero). In other words, variable equalizer is controlled such that the ratio of the amplitude of the first lower sideband to that of the first upper sideband for the burst signal in the reproduced FM video signal output from variable equalizer 204 takes a predetermined constant value by adjustment of gain trimmer 209. Thus, even if the frequency response of the FM video signal varies in the course of recording/reproducing, the optimum equalization can be achieved automatically by means of equalizer 204. As a result, the baseband video signal output to output terminal 207 keeps a desired frequency response, for example, a flat response.

In the present embodiment, the frequency response of a reproduced FM video signal is observed by comparison between amplitudes of first lower and upper sidebands in a burst-signal period. Unlike the prior arts, therefore, the response of variable equalizer 204 does not depend upon a factor, such as a recording level of the video signal. Hence, the proper equalization can be achieved by variable equalizer 204 because the response of variable equalizer 204 is correctly compensated for according to the frequency response of the reproduced FM video signal.

Figure 12:
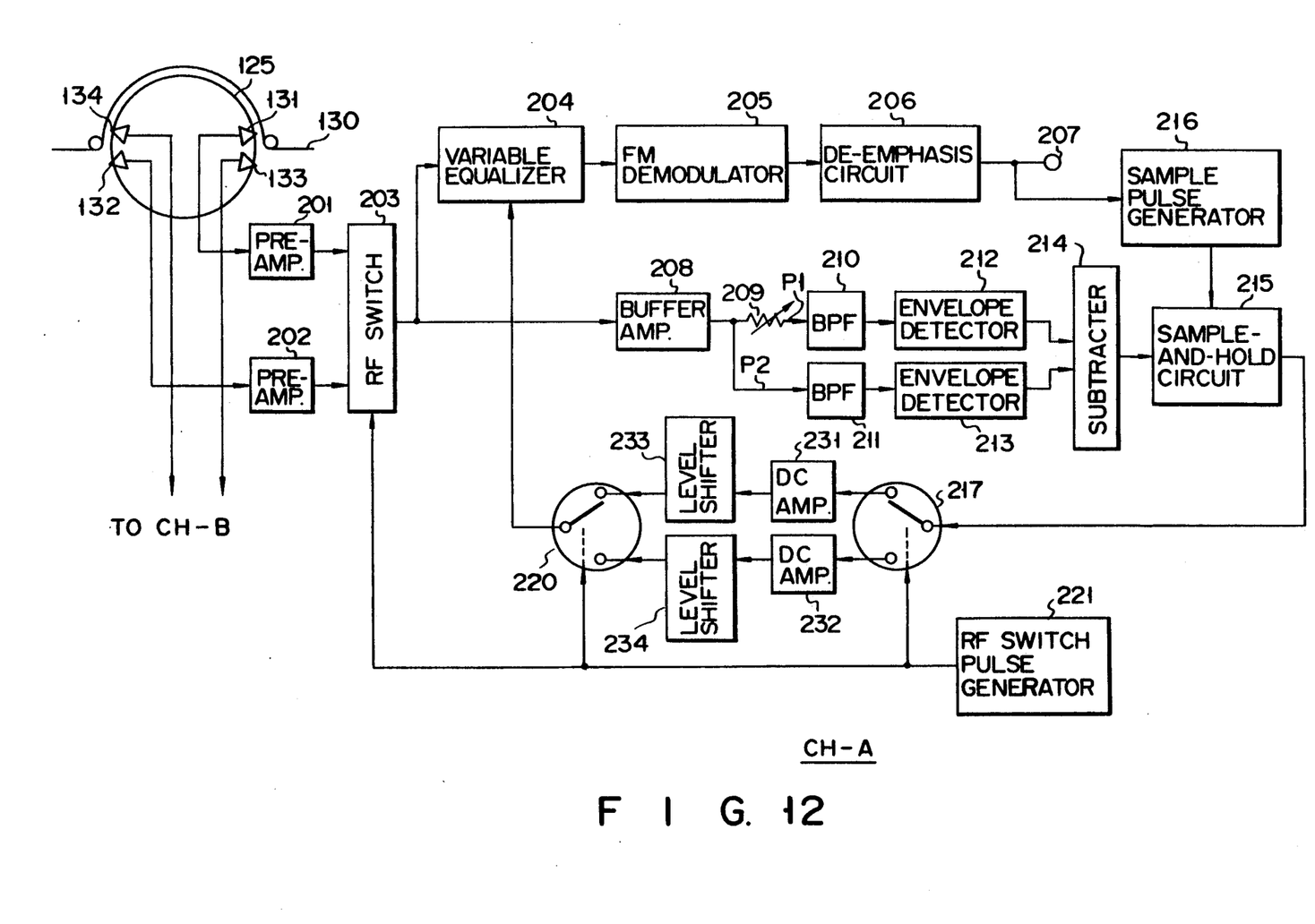
FIG. 12 is a block diagram of a playback system according to another embodiment of the present invention.

FIG. 12 is a block diagram of a reproducing system according to the other embodiment of the present invention. Like reference characters are used to designate corresponding parts to those of FIG. 8. In this embodiment, variable equalizer 204 is controlled by open loop control. That is, to buffer amplifier 208 is applied a reproduced FM video signal from RF switch 203. The arrangement following buffer amplifier 208 is substantially the same as that of FIG. 8. In FIG. 12, however, DC amplifier 231 and level shifter 233 are provided in place of integrator 218 of FIG. 8, while DC amplifier 232 and level shifter 234 are provided in place of integrator 219. DC amplifiers 231 and 232 amplify an output signal of sample and hold circuit 215 to provide control voltages for variable equalizer 204. Level shifters 233 and 234 shift DC levels of output voltages of DC amplifiers 231 and 232 to a region that variable equalizer 204 can respond to. In a case where the magnitude of an output signal of sample and hold circuit 215 is greater than hat of a control voltage required for variable equalizer 204, attenuators may be used in place of DC amplifiers 231 and 232.

Variable equalizer 204 is controlled such that the ratio of the amplitude of the first lower sideband to that of the upper sideband in the burst-signal period of the entered reproduced FM video signal takes a constant value previously determined by adjustment of gain trimmer 209. Hence, the present embodiment can provide the same advantage as the previous embodiment.

The present invention is not limited to the above specific embodiments and may be modified in various ways. In the embodiments, a burst signal inserted in a video signal during the horizontal blanking interval is used as a reference signal for monitoring the frequency response of a reproduced FM video signal. Alternatively, another signal, for example, a signal of a constant frequency inserted in a video signal during the vertical blanking period may be used therefor.

Also, the present invention may be applied to video recording and reproducing apparatus using disks such as optical disks as well as VTRs. The present invention is essentially characterized by an equalizer on the playback side and may thus be applied to apparatus with no recording function.

What is claimed is:

1. An equalization apparatus for equalizing a modulated video signal obtained by frequency-modulating a carrier signal with a video signal in which a reference signal of a constant frequency is inserted during a predetermined period, comprising:
    variable equalizer means having a controllable response, for equalizing a frequency response of the modulated video signal;
    means for comparing, during the predetermined period, each amplitude of at least a pair of upper and lower sidebands in the modulated video signal which each are symmetrical with respect to the frequency of the carrier signal; and
    control means for controlling the response of said variable equalizer means according to an output of said comparing means.

2. The equalization apparatus according to claim 1, in which said comparing means includes means for extracting first upper and lower sidebands as said pair of upper and lower sidebands.

3. The equalization apparatus according to claim 1, in which said comparing means includes first and second filter means for extracting said upper sideband and said lower sideband from the FM video signal; first and second detector means for detecting output signals of said first and second filter means, respectively; subtracter means for obtaining a difference between output signals of said first and second detector means; and sample and hold circuit means for sampling an output signal of said subtracter means with each appearance of the reference signal and holding it until the next reference signal appears.

4. An equalization apparatus for an FM video signal obtained by frequency-modulating a carrier signal with a video signal in which a reference signal of a constant frequency is inserted during a predetermined interval, comprising:
    variable equalizer means for equalizing the frequency response of the FM video signal;
    detector means for detecting, during the predetermined interval, a ratio in amplitude between a pair of upper and lower sidebands in an FM video output signal of said variable equalizer means which are symmetrical about the frequency of the carrier signal; and
    control means for controlling said variable equalizer means such that the detected ratio takes a predetermined constant value.

5. The equalization apparatus according to claim 4, in which said detecting means includes means for extracting first upper and lower sidebands as said pair of upper and lower sidebands.

6. The equalization apparatus according to claim 4, in which said detecting means produces an output signal which becomes minimum when said ratio takes the predetermined constant value; and said control means controls said variable equalizer means such that the output signal of said detecting means is minimized.

7. The equalization apparatus according to claim 4, in which said detecting means includes first and second signal paths supplied with the FM video signal; first and second filter means for extracting said upper sideband and said lower sideband, respectively from the FM video signal on said first and second signal paths; first and second detector mans for detecting output signals of said first and second filter means, respectively; means for adjusting the gain of one of said first and second signal paths relative to the other; subtracter means for obtaining a difference between output signals of said first and second detector means; and sample and hold circuit means for sampling an output signal of said subtracter means with each appearance of the reference signal and holding it until the next reference signal appears.

8. The equalization apparatus according to claim 4, in which said control means includes integrator means for integrating an output signal of said detecting means to produce a control signal for controlling said variable equalizer means.

9. An equalization apparatus for an FM video signal obtained by frequency-modulating a carrier signal with a video signal in which a reference signal of a constant frequency is inserted during a predetermined interval, comprising:
    variable equalizer means for equalizing the frequency response of the FM video signal;
    comparator means for making, during said predetermined interval, a comparison in amplitude between a pair of upper and lower sidebands in an FM video input signal of said variable equalizer means which are symmetrical about the frequency of the carrier signal; and
    means for converting the amplitude and DC level of an output signal of said comparator means to produce a control signal for controlling said variable equalizer means.

10. The equalization apparatus according to claim 9, in which said comparator means includes first and second filter means for extracting said upper sideband and said lower sideband, respectively, from the FM video signal; first and second detector means for detecting output signals of said first and second filter means, respectively; subtracter means for obtaining a difference between output signals of said first and second detector means; and sample and hold circuit means for sampling an output signal of said subtracter means with each appearance of the reference signal and holding it until the next reference signal appears.

11. A video recording and reproducing apparatus comprising:
    means for generating an FM video signal by frequency-modulating a carrier signal with a video signal in which a burst signal of a predetermined frequency is inserted during a predetermined blanking interval;
    recording means for recording the FM video signal;
    reproducing means for reproducing the recorded FM video signal;
    variable equalizer means for equalizing the frequency response of the reproduced FM video signal;

comparing means for making, during said predetermined blanking interval, a comparison in amplitude between a pair of upper and lower sidebands in the reproduced FM video signal which are symmetrical about the frequency of the carrier signal; and control means for controlling said variable equalizer means according to the output of said comparing means.

12. A video recording and reproducing apparatus using a magnetic recording medium comprising:

means for generating an FM video signal by frequency-modulating a carrier signal with a video signal in which a reference signal of a predetermined frequency is inserted during a predetermined interval;

recording means having a plurality of recording heads for recording the FM video signal on the recording medium;

reproducing means having a plurality of reproducing heads for reproducing the recorded FM video signal;

multiplexing means for multiplexing FM video signals reproduced by said reproducing heads for transmission over one channel;

variable equalizer means connected to said multiplexing means for equalizing the frequency response of the multiplexed FM video signals;

comparing means for making, during said predetermined interval, a comparison in amplitude between a pair of upper and lower sidebands in the multiplexed FM video signal which are symmetrical about the frequency of the carrier signal; and control means for controlling said variable equalizer means according to the output of said comparing means.

13. The apparatus according to claim 12, in which said control means includes a plurality of control signal generating means for generating control signals to control said variable equalizer means according to the output of said comparing means, and switching means for switching said plurality of control signal generating means in sync with said multiplexing means.

14. The apparatus according to claim 13, in which said control signal generating means includes an integrator for integrating an output signal of said comparing means.

15. The apparatus according to claim 13, in which said control signal generating means includes means for converting the amplitude and DC level of an output signal of said comparing means.

* * * * *